(12) United States Patent
Gray et al.

(10) Patent No.: US 8,388,277 B2
(45) Date of Patent: Mar. 5, 2013

(54) INTERNAL CHAMFERING DEVICE AND METHOD

(75) Inventors: Everette D. Gray, Mukilteo, WA (US); Mekonnen Tsegga, Lynwood, WA (US); Farahnaz Sisco, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 1335 days.

(21) Appl. No.: 12/118,068

(22) Filed: May 9, 2008

(65) Prior Publication Data
US 2009/0279970 A1 Nov. 12, 2009

(51) Int. Cl.
*B23B 35/00* (2006.01)
(52) U.S. Cl. .............................. 408/1 R; 408/158; 82/1.2
(58) Field of Classification Search ................... 408/1 R, 408/153, 158, 168, 169, 170, 178, 161, 173; 82/1.2, 1.4, 11.1, 1.11
See application file for complete search history.

(56) References Cited

U.S. PATENT DOCUMENTS

| | | | |
|---|---|---|---|
| 2,716,360 A * | 8/1955 | Cogsdill et al. ................... 82/1.2 |
| 4,778,313 A * | 10/1988 | Lehmkuhl ..................... 409/127 |
| 4,949,039 A | 8/1990 | Grunberg |
| 5,116,168 A * | 5/1992 | Aihara ........................... 408/1 R |
| 5,120,167 A * | 6/1992 | Simpson ........................ 408/158 |
| 5,197,361 A * | 3/1993 | Carrier et al. ..................... 82/1.2 |
| 5,613,810 A * | 3/1997 | Bureller .............................. 408/3 |
| 5,685,674 A * | 11/1997 | Tåquist et al. ................. 409/132 |
| 5,857,813 A * | 1/1999 | Kress et al. ................... 408/1 R |
| 6,158,929 A * | 12/2000 | Fisher ............................ 408/1 R |
| 6,331,093 B1 * | 12/2001 | Graham et al. ............... 408/1 R |
| 7,328,637 B2 * | 2/2008 | Takashima et al. ............ 82/1.11 |

FOREIGN PATENT DOCUMENTS

DE 4010075 A1 * 10/1991
DE 4228322 A1 * 3/1994

* cited by examiner

*Primary Examiner* — Daniel Howell
*Assistant Examiner* — Paul M Janeski
(74) *Attorney, Agent, or Firm* — Hanley, Flight & Zimmerman, LLC (57) ABSTRACT

A method of forming an opening in a layered structure includes providing a layered structure including a first layer and a second layer and a near-zero gap interface defined between the first layer and the second layer; providing an opening through the layered structure such that the opening extends through the first layer and the second layer; and working simultaneously the opening in the fay surface of the first layer and the opening in the fay surface of the second layer without separating the first layer and the second layer. An internal chamfering device is also disclosed.

18 Claims, 8 Drawing Sheets

INTERNAL CHAMFERING DEVICE AND METHOD

TECHNICAL FIELD

The disclosure relates to chamfering devices. More particularly, the disclosure relates to an internal chamfering device and method suitable for deburring and chamfering drilled fastener openings in mating parts.

BACKGROUND

Component parts which include titanium and carbon fiber-reinforced plastic may be assembled with standard aircraft fasteners. The fastener openings drilled in these parts may be subject to entry/exit burr which may reduce the fatigue strength of the titanium part. A key problem in the conventional drilling process is the difficulty and expense of disassembling, deburring and applying a chamfer to drilled parts in a time-effective and cost-effective manner. Therefore, an internal chamfering device and method which is suitable for deburring and chamfering drilled fastener openings in mating parts is needed.

SUMMARY

The disclosure is generally directed to a method of forming an opening in a layered structure. An illustrative embodiment of the method includes providing a layered structure including a first layer and a second layer and a near-zero gap interface defined between the first layer and the second layer; providing an opening through the layered structure such that the opening extends through the first layer and the second layer; and working simultaneously the opening in the fay surface of the first layer and the opening in the fay surface of the second layer without separating the first layer and the second layer.

The disclosure is further generally directed to an internal chamfering device. An illustrative embodiment of the device includes a generally elongated device housing having a tool bit opening; a cam bar provided in the device housing and displaceable along a longitudinal axis of the device housing; a slot depression provided in the cam bar; a tool bit slot provided in the cam bar and extending along the slot depression; and a tool bit slidably engaging the tool bit slot and extendable through the tool bit opening.

BRIEF DESCRIPTION OF THE ILLUSTRATIONS

DETAILED DESCRIPTION

The disclosure is generally directed to an internal chamfering device and method suitable for creating a material interface chamfer for the reduction of fatigue created by entry and exit burrs in the process of drilling fastener openings in interfacing first and second layers of a layered structure. The internal chamfering device is particularly suitable for creating a material interface chamfer in fastener openings drilled in interfacing component parts in the fabrication of aircraft. However, the internal chamfering device is adaptable to creating a material interface chamfer for the reduction of fatigue in fastener openings drilled in interfacing component parts in a variety of industries.

Figure 1:
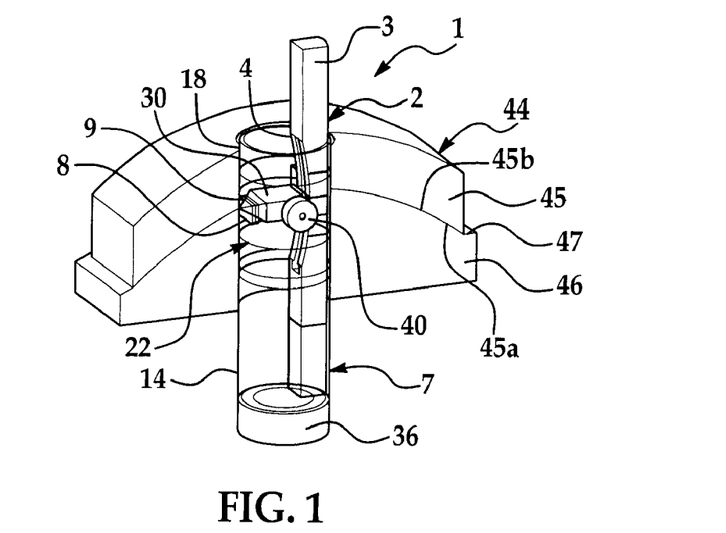
FIG. 1 is a perspective view of an illustrative embodiment of the internal chamfering device, deburring an opening extending through first and second layers of a layered structure.
Figure 2:
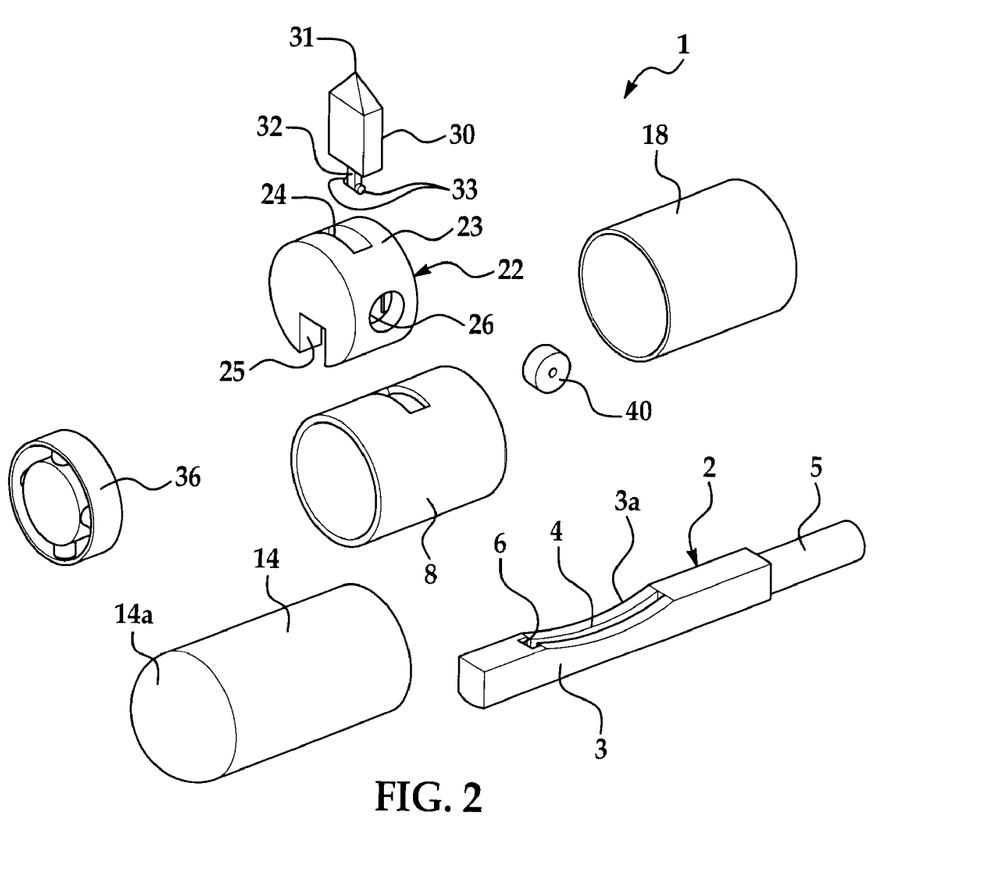
FIG. 2 is an exploded perspective view of an illustrative embodiment of the internal chamfering device.
Figure 3:
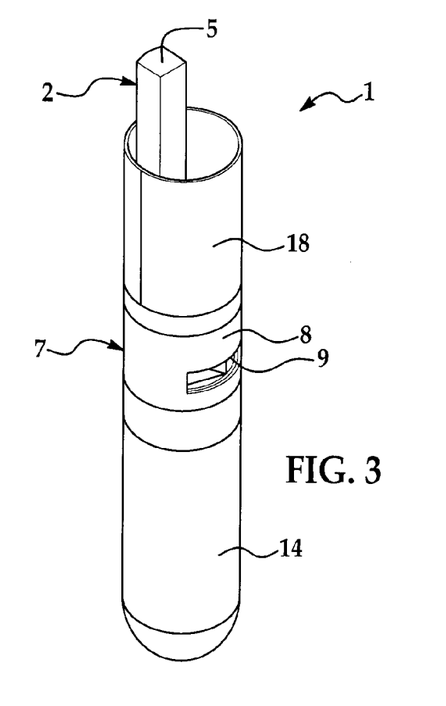
FIG. 3 is a side perspective view of an illustrative embodiment of the internal chamfering device.

Referring initially to FIGS. 1-6 and 8 of the drawings, an illustrative embodiment of the internal chamfering device, hereinafter device, is generally indicated by reference numeral 1. The device 1 may include a device housing 7 (FIGS. 3 and 4) which may have a generally elongated, cylindrical shape. As shown in FIG. 2, the device housing 7 may include a generally elongated, cylindrical tool base 14, which may have a convex base cap 14a; and a generally elongated, cylindrical rear sleeve 18 which is disposed in spaced-apart relationship with respect to the tool base 14. A center sleeve 8 may be displaceably mounted between the tool base 14 and the rear sleeve 18 along a longitudinal axis of the device housing 7, according to the knowledge of those skilled in the art. A tool bit opening 9 may extend through the wall of the center sleeve 8 for purposes which will be hereinafter described.

Figure 4:
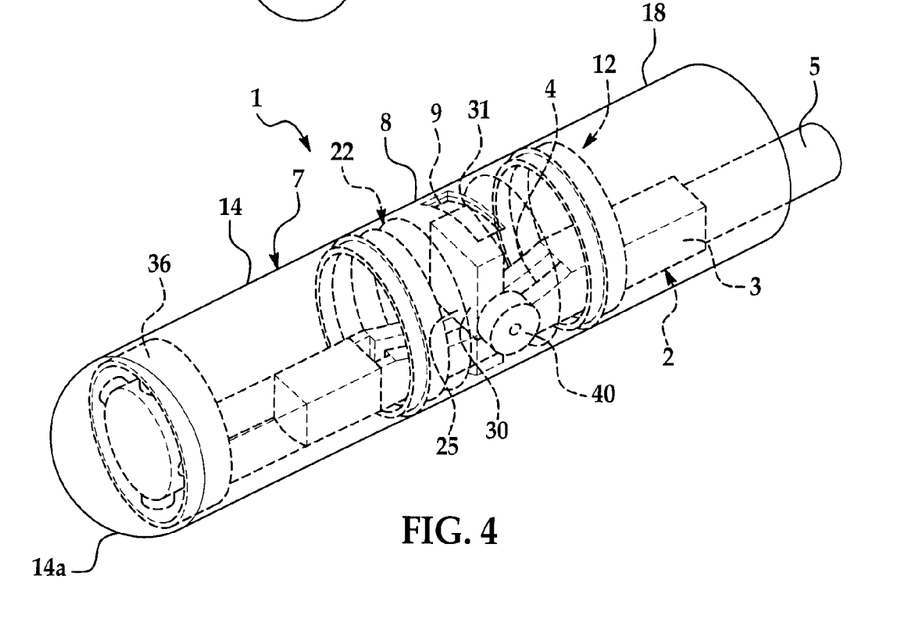
FIG. 4 is a front perspective view of an illustrative embodiment of the internal chamfering device.
Figure 5:
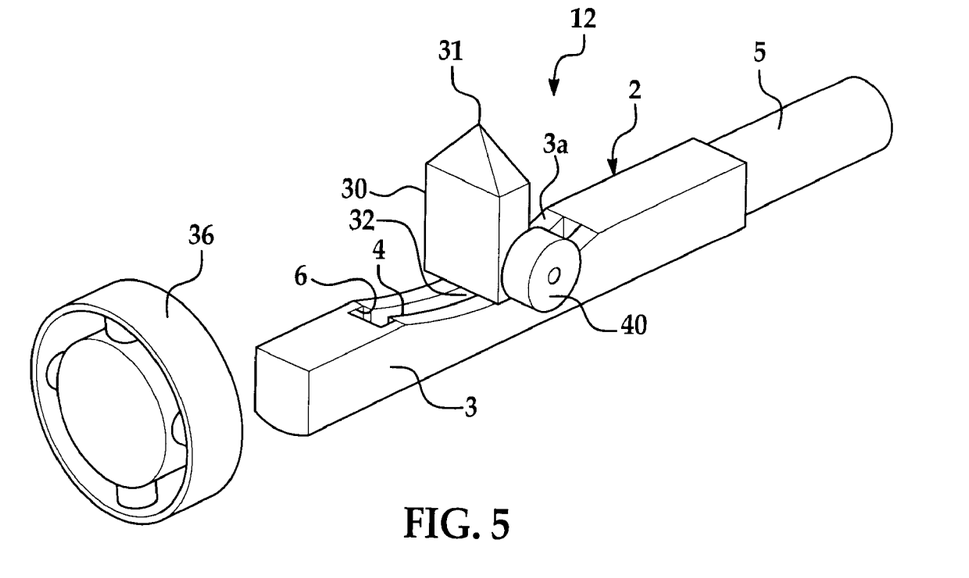
FIG. 5 is a perspective view of a cutting assembly of an illustrative embodiment of the internal chamfering device.
Figure 6:
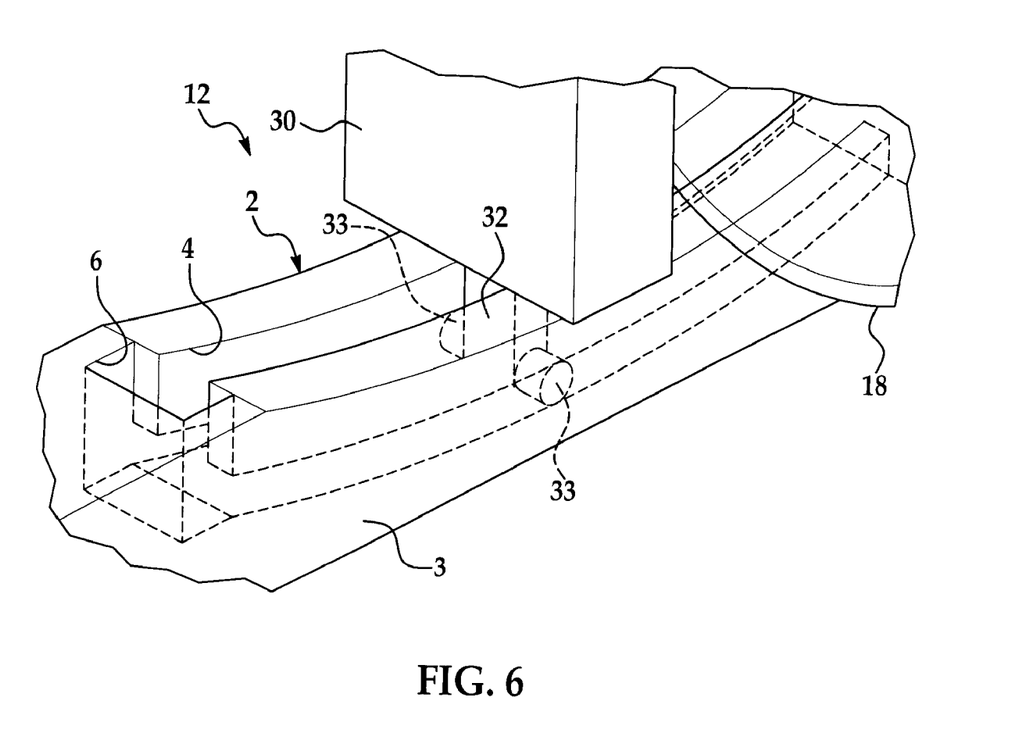
FIG. 6 is a perspective view illustrating an exemplary technique for attaching a tool bit to a cam bar of an illustrative embodiment of the internal chamfering device.

As shown in FIG. 5, a cutting assembly 12 may be provided in the device housing 7 (FIG. 4) of the device 1. The cutting assembly 12 may include a generally elongated cam bar 2 which may extend through the interior of the device housing 7 which is defined by the tool base 14, the center sleeve 8 and the rear sleeve 18. The cam bar 2 may be mounted for linear displacement in the device housing 7 along a longitudinal axis of the device 1 as will be hereinafter described. The cam bar 2 may have a generally elongated slotted bar portion 3 which may have a generally rectangular cross-section. A bar extension 5 may extend from the slotted bar portion 3. A generally concave slot depression 3a may extend into a surface of the slotted bar portion 3. An elongated tool bit slot 4 may extend into the slotted bar portion 3 along the slot depression 3a. An attachment pin slot 6 may be provided in the slotted bar portion 3 at one end of the tool bit slot 4.

The cutting assembly 12 may include a tool bit 30 which has a cutting point 31 and is stationary with respect to the tool bit opening 9 in the center sleeve 8. The tool bit 30 may be mounted in the tool bit slot 4 using any suitable technique known to those skilled in the art. As shown in FIG. 2, in some embodiments, a tool bit flange 32 may extend from the tool bit 30. Attachment pins 33 (FIG. 6) may extend from opposite sides of the tool bit flange 32. The attachment pins 33 may be inserted into the tool bit slot 4 through the attachment pin slot 6 to slidably mount the tool bit 30 along the tool bit slot 4. Therefore, as the cam bar 2 is linearly moved along the interior of the device housing 7, the tool bit slot 4 moves with respect to the stationary tool bit 30. When it is located at the center portion of the slot depression 3a, the tool bit 30 reverts to a retracted position with respect to the tool bit opening 9 of the device housing 7, as shown in FIGS. 1 and 4. Conversely, when it is located at either end portion of the slot depression 3a, the tool bit 30 is extended from the device housing 7 through the tool bit opening 9 for purposes which will be hereinafter described. A giant magnetoresistive tracking probe 40 may be located 90 degrees either counter clockwise or clockwise from the central axis of the tool bit 30 for purposes of tracking the position of the tool bit 30.

As further shown in FIG. 2, in some embodiments, the cutting assembly 12 may include a tool bit guide 22 which may be mounted inside the center sleeve 8 of the device housing 7. The tool bit guide 22 may have a generally cylindrical guide body 23. A tool bit slot 24 may extend into the guide body 23 in generally aligned or registering relationship with respect to the tool bit opening 9 provided in the center sleeve 8. A guide notch 25 may be provided in the guide body 23. The guide notch 25 may be sized and configured to receive the slotted bar portion 3 of the cam bar 2 and facilitate selective bidirectional linear displacement of the cam bar 2 with respect to the tool bit guide 22. A tracking probe opening 26 may be provided in the guide body 23 to accommodate the giant magnetoresistive tracking probe 40. The tool bit 30 extends through the tool bit slot 24 such that the tool bit guide 22 maintains the tool bit 30 in a stationary position with respect to the tool bit opening 9 inside the device housing 7.

As shown in FIGS. 4 and 5, the device 1 may include two GMR sensors: a main magnetoresistance probe 36 which may be disposed in spaced-apart relationship with respect to the tool bit guide 22, for example, and a magnetoresistance tracking probe 40 which may be provided on the tool bit guide 22, for example. The main magnetoresistance probe 36 is used to determine an estimate of the interface location. The magnetoresistance tracking probe 40 is used to maintain the alignment of the tool bit 30 with respect to the material interface. The main magnetoresistance probe 36 may include an electro magnetic excitation coil, a magnetic flux concentrator and a GMR sensor. The excitation coil may be driven by external circuitry to generate an electromagnetic pulsation having a frequency which is sufficient to permeate the materials which are subject to the chamfering operation. By way of natural physical forces, this electromagnetic pulsation is absorbed and reflected back towards the emitter/sensor arrangement. The variable electromagnetic response and the resultant effect on the GMR material between a solid undisturbed area and an area that contains a material interface, whether that interface is off similar or dissimilar materials, is used to determine the location of the interface. P. Grunberg, "Magnetic Field Sensor With Ferromagnetic Thin Layers Having Magnetically Antiparallel Polarized Components", U.S. Pat. No. 4,949,039.

Figure 8:
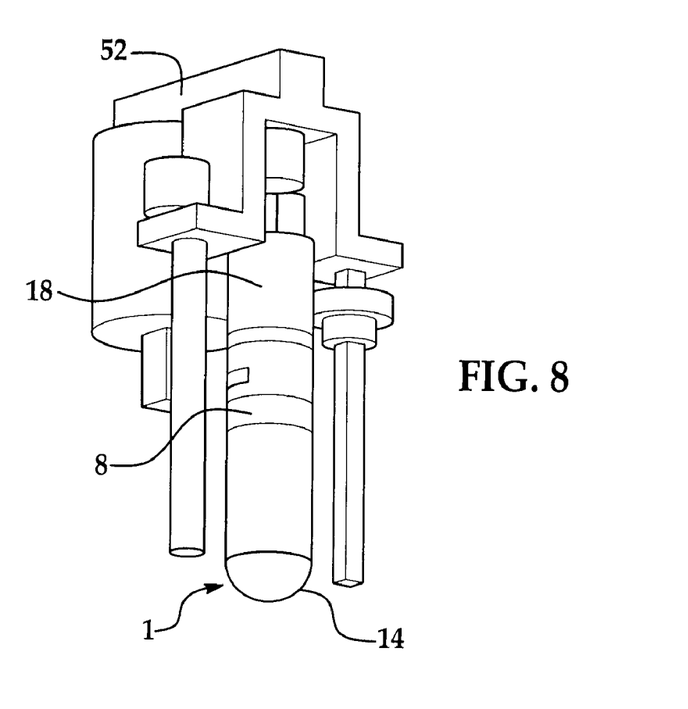
FIG. 8 is a perspective view of an illustrative embodiment of the internal chamfering device, mounted on a mount frame.
Figure 9:
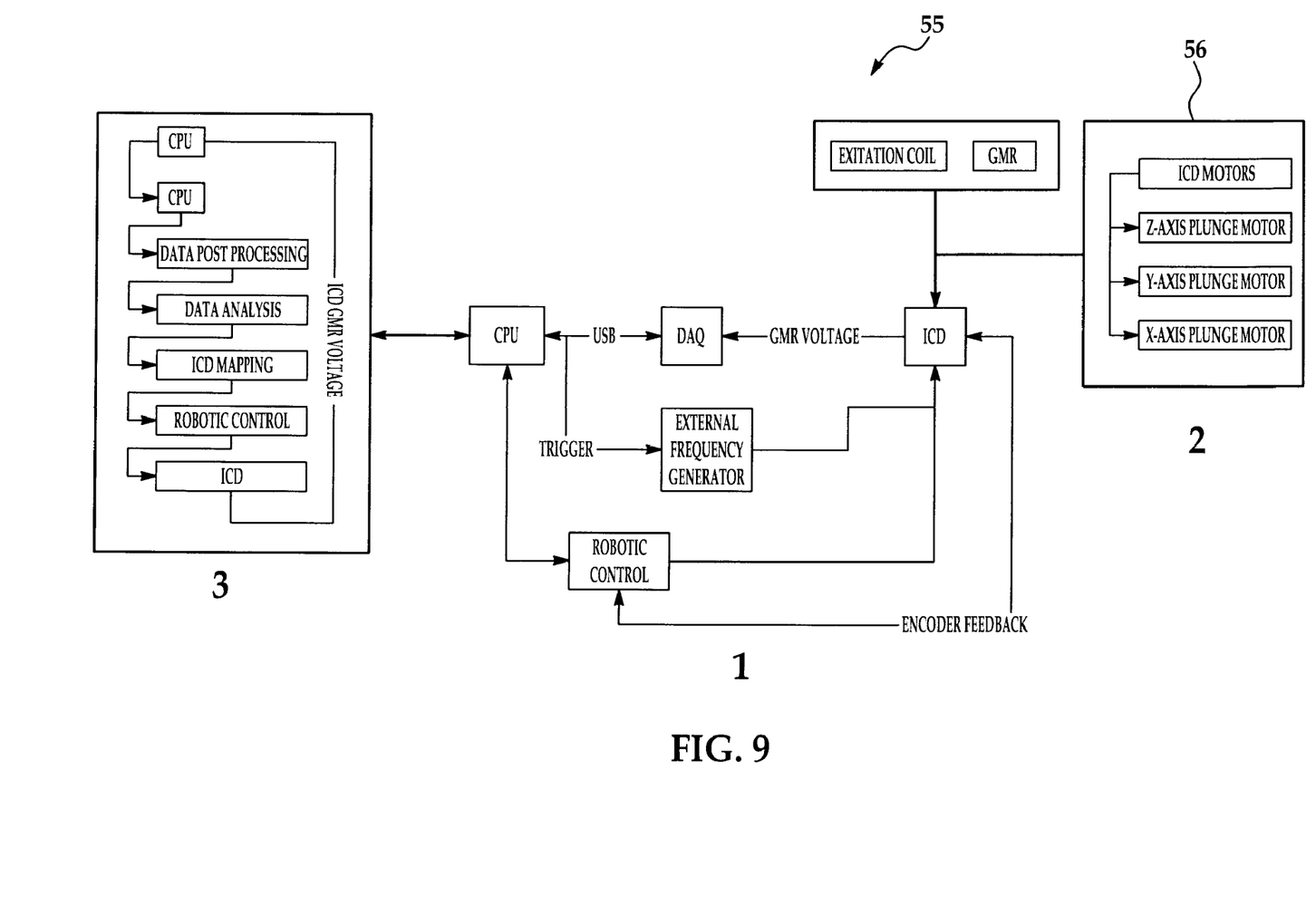
FIG. 9 is a schematic block diagram illustrating a hardware-software interface of an illustrative embodiment of the internal chamfering device.

As shown in FIG. 8, the device 1 may be mounted on a mount frame 52 of selected design. A hardware/software interface 55 which is suitable for implementation of the device 1 is shown in FIG. 9. Various ICD motors 56 may be connected to the device 1 according to the knowledge of those skilled in the art to facilitate various movements of the device 1 with respect to the mount frame 52 (FIG. 8). The ICD motors 56 may include, for example, a z-axis plunge motor 57 which may be adapted to engage the device 1 and move the device 1 along a z-axis; a y-axis rotation motor 58 which may be adapted to engage the device 1 and rotate the device 1 about a y-axis; and an x-axis tool bit motor 59 which may be adapted to drivingly engage the cam bar 2 of the device 1 and move the cam bar 2 in either linear direction in the device housing 7 to extend or retract the tool bit 30 of the device 1 with respect to the tool bit opening 9 in the center sleeve 8 of the device housing 7. The x-axis tool bit motor 59 may engage the bar extension 5 of the cam bar 2, for example.

Figure 7:
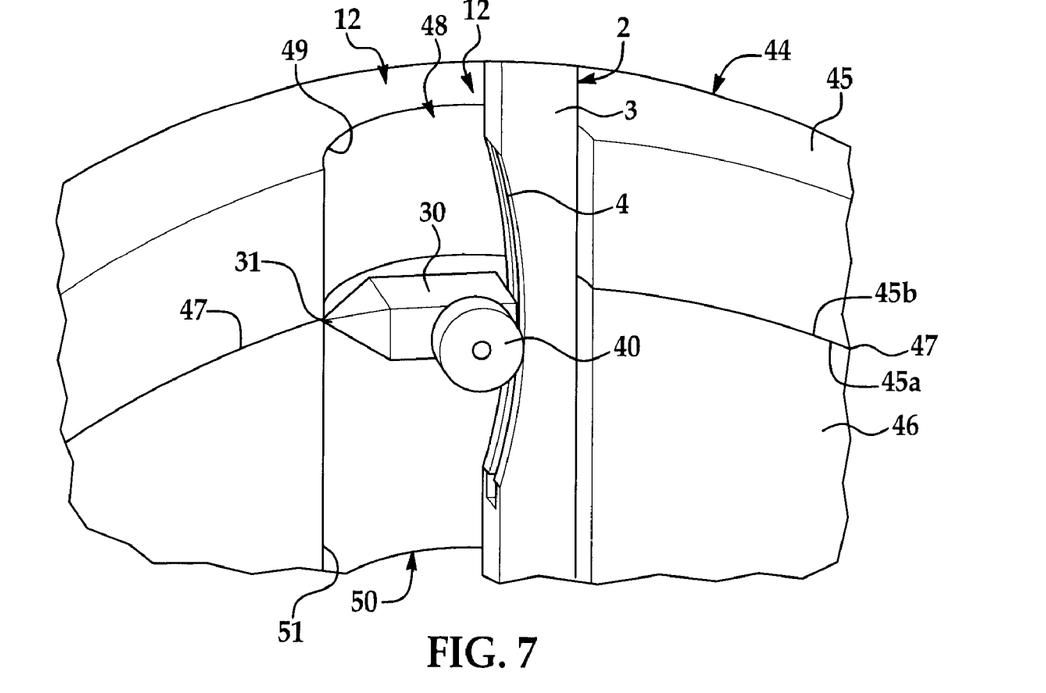
FIG. 7 is a cross sectional view of the cutting assembly of an illustrative embodiment of the internal chamfering device, more particularly illustrating operation of the device in deburring of an opening extending through first and second layers of a layered structure.

Referring next to FIGS. 1 and 7, in typical application the device 1 is used to remove entry and exit burrs (not shown) from and create a material interface chamfer (not shown) in an interior surface 49 (FIG. 7) of a first opening 48 which is drilled in a first layer 45 and in an interior surface 51 (FIG. 7) of a second opening 50 which is drilled in a second layer 46 of a layered structure 44. The purpose of the first opening 48 and the second opening 50 may be to receive a fastener (not shown) which secures the first layer 45 and the second layer 46 to each other. The first layer 45 and the second layer 46 of the layered structure 44 may meet at a layer interface 47. The first layer 45 may have a first fay surface 45a. The second layer 46 may have a second fay surface 46a which meets the first fay surface 45a of the first layer 45 at the layer interface 47. The first opening 48 and the second opening 50 may be drilled into the first layer 45 and the second layer 46, respectively, after the first layer 45 and the second layer 46 are placed together. In some applications the first layer 45 may be a composite material, for example and without limitation, whereas the second layer 46 may be titanium, for example and without limitation. During drilling of the first opening 48 and the second opening 50, entry and exit burrs (not shown) may be left in the first opening 48 and the second opening 50. If left in place, the entry and exit burrs may reduce the fatigue strength of the first layer 45 and/or the second layer 46, particularly if one of the first layer 45 and the second layer 46 is titanium.

The device 1 is inserted into the first opening 48 and the registering second opening 50, as shown in FIG. 1. In FIG. 7, the cutting assembly 12 of the device 1 is shown in the functional chamfering position inside the first opening 48 and the second opening 50. By operation of the z-axis plunge motor 57 (FIG. 9), the device 1 can be moved along the z-axis inside the first opening 48 and the second opening 50. By operation of the y-axis rotation motor 58 (FIG. 9), the device 1 can be rotated about the y-axis inside the first opening 48 and the second opening 50. By operation of the x-axis tool bit motor 59, the cam bar 2 can be moved linearly inside the device housing 7 to selectively extend and retract the tool bit 30 from and into, respectively, tool bit opening 9 in the center sleeve 8 of the device housing 7. Therefore, by extension of the tool bit 30 from the tool bit opening 9 and against the interior surface 49 of the first opening 48 and the interior surface 51 of the second opening 50, in combination with linear and rotational movement of the device 1 in the first opening 48 and the second opening 50, the tool bit 30 removes entry and exit burrs (not shown) from and creates a material interface chamfer (not shown) in the interior surfaces 49, 51. This may enhance the fatigue strength of the first layer 45 and/or the second layer 46, particularly in applications in which the first layer 45 and/or the second layer 46 is titanium. The deburring and/or chamfering of the first opening 48 and the second opening 50 may be carried out without separating the first layer 45 and the second layer 46.

Figure 10:
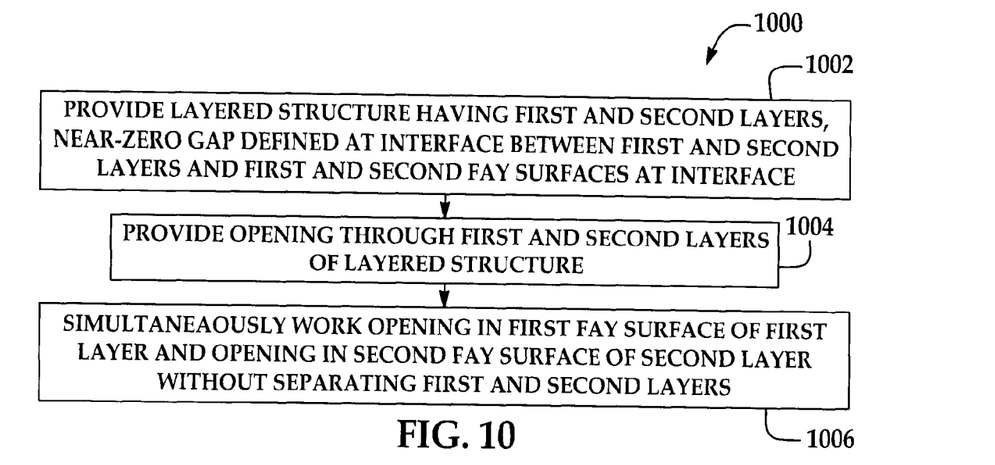
FIG. 10 is a flow diagram which illustrates an illustrative embodiment of a method of forming an opening in a layered structure.

Referring next to FIG. 10 of the drawings, a flow diagram 1000 which illustrates an illustrative embodiment of a method of forming an opening in a layered structure is shown. In block 1002, a layered structure having first and second layers; a near-zero gap defined at an interface between the first and second layers; and first and second fay surfaces at the interface is provided. In block 1004, an opening is provided through the first layer and the second layer of the layered structure. In block 1006, the opening in the first fay surface of the first layer and the second fay surface of the second layer is worked without separating the first layer and the second layer. Working of the opening in the first fay surface and working of the opening in the second fay surface may include deburring and/or chamfering of the openings.

In some embodiments, an intermediate layer may be disposed at the interface such that the layered structure is a sandwich-type structure with the first and second layers defining outer layers and the intermediate layer defining an inner structure, such that the fay surfaces of the first and second layers abut the intermediate layer. Providing the openings in the first and second layers may include drilling an opening through the layered structure such that each of the layers has an opening extending therethrough. Working of the openings in the first and second fay surfaces may further include working simultaneously the opening in the fay surface of the first layer, the opening in the fay surface of the second layer and the opening in the intermediate layer without separating the layers.

The first and second layers of the layered structure may include a material selected from a group comprising metals and composites. The intermediate layer may include a material selected from a group comprising composites, adhesives and sealants.

In some applications, the layered structure may be a sandwich-type structure including outer layers of titanium and an intermediate composite layer and a zero-gap interface defined between each of the titanium layers and the composite layer such that each of the layers has a fay surface at an interface. The working step may further include working simultaneously the opening in the fay surface of a first one of the titanium layers and the opening in the corresponding fay surface of the composite layer without separating the layers. In some applications, the method may further include working simultaneously the opening in the fay surface of a second one of the titanium layers and the opening in the corresponding fay surface of the composite layer without separating the layers.

Figure 14:
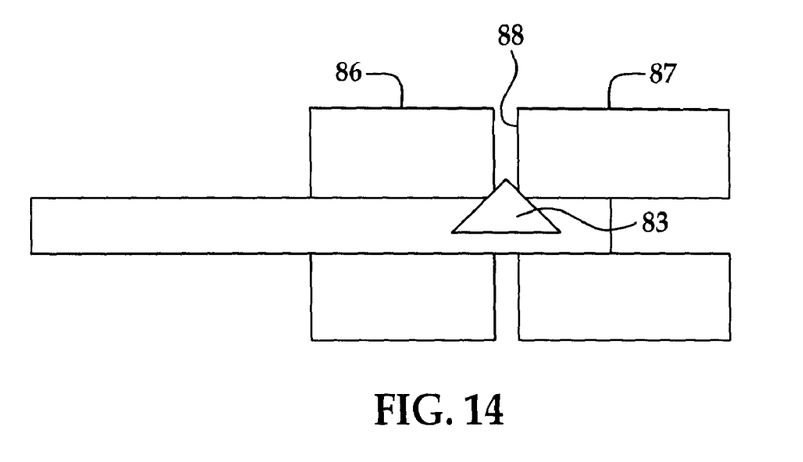
FIG. 14 is a schematic diagram which illustrates deburring of a titanium/titanium stack workpiece.
Figure 15:
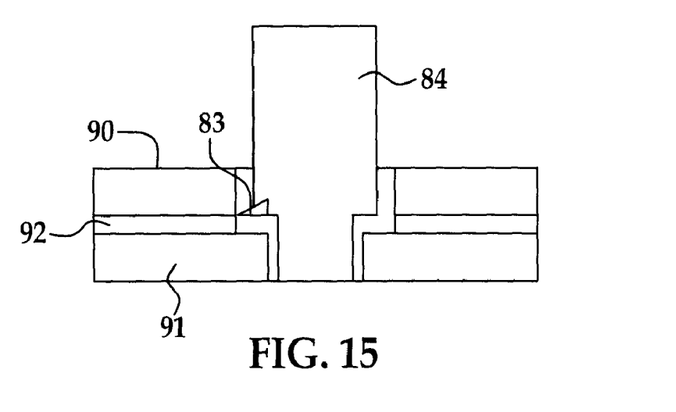
FIG. 15 is a schematic diagram which illustrates modification of a pilot and cutting blade of the deburring tool for deburring of openings with different diameters.
Figure 16:
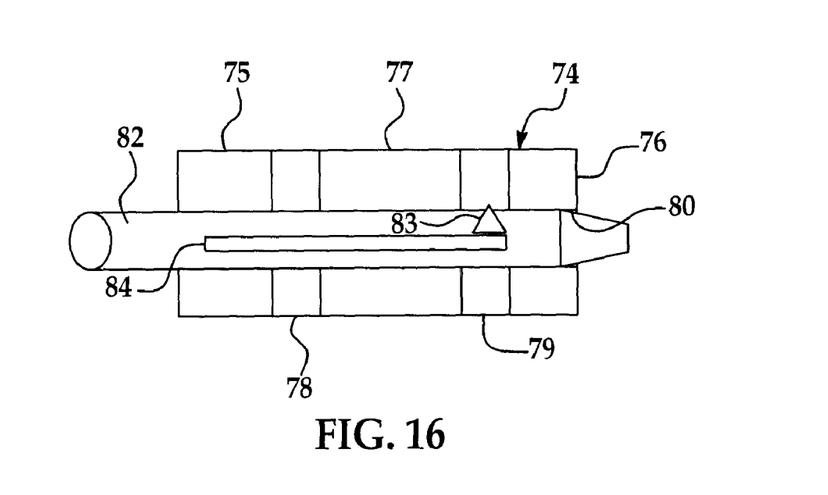
FIG. 16 is a schematic diagram of a titanium/graphite/titanium stack workpiece in implementation of the deburring tool shown in FIGS. 11 and 12.

Referring next to FIGS. 11-16 of the drawings, a deburring tool 64 which is suitable for interface metal deburring of an opening 80 drilled in a workpiece 74 is shown. As shown in FIG. 16, the workpiece 74 may be a titanium/graphite/titanium stack having a first titanium plate 75, a second titanium plate 76 and a graphite plate 77 sandwiched between the first titanium plate 75 and the second titanium plate 76. A first shim 78 may be interposed between the first titanium plate 75 and the graphite plate 77. A second shim 79 may be interposed between the graphite plate 77 and the second titanium plate 76. Each of the first shim 78 and the second shim 79 may be fiberglass, for example. The opening 80 is drilled through the first titanium plate 75, the first shim 78, the graphite plate 77, the second shim 79 and the second titanium plate 76, respectively, of the workpiece 74. After drilling of the opening 80, a metal burr (not shown) may extend from each titanium plate 75, 76 into the opening 80 and may require removal, or deburring, prior to extension of a fastener (not shown) through the opening 80. Accordingly, metal interface deburring of the opening 80 may be carried out using the deburring tool 64 without the requirement of first disassembling the workpiece 74.

Figure 11:
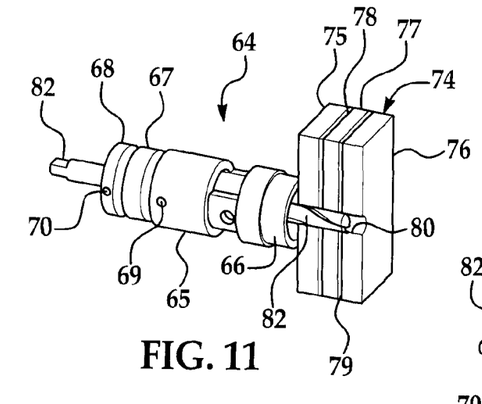
FIG. 11 is a perspective view of a deburring tool, more particularly illustrating adjustment of a cutting blade in an opening previously drilled in a titanium/graphite/titanium stack workpiece preparatory to deburring of the opening.
Figure 12:
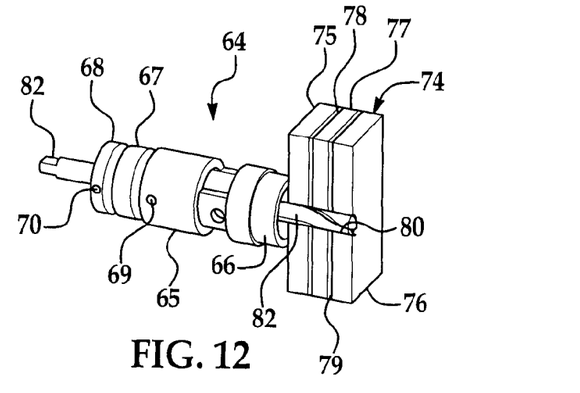
FIG. 12 is a perspective view of a deburring tool shown in FIG. 11, more particularly illustrating a second position of the cutting blade in the opening.

As shown in FIGS. 11 and 12, the deburring tool 64 may include a tool housing 65 which may have a generally elongated, cylindrical shape. A nosepiece 66 may be provided on a front end of the tool housing 65. A nose piece stop 67 may be provided on a rear end of the tool housing 65. A chamfer depth control knob 68 may be provided on the nose piece stop 67.

An elongated cutting blade adjustment shaft 82 extends through the tool housing 65, the nosepiece 66, the nosepiece stop 67 and the chamfer depth control knob 68. The nosepiece 66 threadably engages the cutting blade adjustment shaft 82 to facilitate selective extension and retraction of the cutting blade adjustment shaft 82 with respect to the tool housing 65 responsive to rotation of the nosepiece 66. A locking set screw 69 and a locking set screw 70 may be threaded through respective set screw openings (not shown) provided in the tool housing 65 and the chamfer depth control knob 68, respectively, to engage and disengage the cutting blade adjustment shaft 82 responsive to threading and unthreading, respectively, of the locking set screws 69 and 70 in the respective set screw openings.

As shown in FIG. 16, a blade pilot 84 is provided in the cutting blade adjustment shaft 82. A cutting blade 83 is extendable from a blade slot (not shown) provided in the cutting blade adjustment shaft 82. Rotation of the nosepiece 66 facilitates movement of the cutting blade 83 along a longitudinal axis of the cutting blade adjustment shaft 82 as the cutting blade adjustment shaft 82 is extended and retracted with respect to the tool housing 65. The chamfer depth control knob 68 operably engages the cutting blade 83 in such a manner that rotation of the chamfer depth control knob 68 facilitates selective extension and retraction of the cutting blade 83 in the blade slot (not shown) provided in the cutting blade adjustment shaft 82.

In typical application of the deburring tool 64, an aluminum and titanium set-up coupon (not shown) having the same thickness as the workpiece 74 is obtained. Feeler gauges (not shown) can be used to make up the thickness of the set-up coupon. An opening (not shown) having the same size as the opening 80 which is to be drilled in the workpiece 74 is drilled in the set-up coupon. The drilled opening is cleaned and the burr removed from at least one side of the coupon. The nosepiece 66 of the deburring tool 64 is then turned clockwise or counterclockwise until the blade tip of the cutting blade 83 is even with the exit side of the opening.

Figure 13:
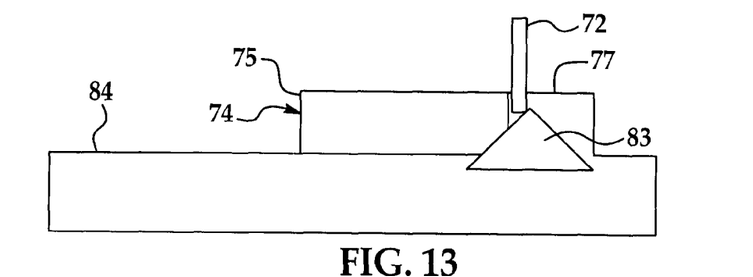
FIG. 13 is a schematic diagram which illustrates positioning of the cutting blade of the deburring tool for deburring of the opening.

The blade pilot 84 of the deburring tool 64 is then inserted into the opening drilled in the set-up coupon. The nosepiece 66 is then adjusted until the tip of the cutting blade 83 is about 0.05" away from the edge of the opening, as shown in FIG. 13. As the cutting blade adjustment shaft 82 is pushed in the tool housing 65 (and using a 0.05" shim), the location of the blade tip is checked. The nosepiece 66 may be adjusted as needed to position the tip of the cutting blade 83 to 0.005" away from the coupon. The locking set screw 70 may then be tightened against the cutting blade adjustment shaft 82. Positioning of the tip of the cutting blade 83 about 0.005" away from the periphery of the opening eliminates undercut (groove) in the metal structure and allows thickness variation in up to 0.003".

Adjustment of the chamfer depth control knob 68 may be accomplished by holding the deburring tool 64 with a vise (not shown). The nosepiece 66 is pushed down and protrusion of the cutting blade 83 from the cutting blade adjustment shaft 82 is measured. The chamfer depth control knob 68 is then adjusted until the tip of the cutting blade 83 protrudes 0.005" from the blade pilot 84. The locking set screw 70 is then lightly tightened. An opening in the coupon is deburred. The chamfer is checked and the chamfer depth control knob 68 is adjusted until the desired depth of the chamfer is achieved. A TRULOCK (trademark) chamfer gauge (not shown) may be used to measure the chamfer depth. After the desired chamfer depth is achieved, the locking set screws 69, 70 may be tightened. A titanium plate may be used to check the final chamfer depth and make the necessary adjustments to the cutting blade 83.

For cutting of blade protrusion and location, the steps outlined hereinabove are followed. A set-up coupon, which may be any material but is preferably aluminum and may have the thickness of the first titanium plate 75, the first shim 78, the graphite plate 77 and the second shim 79 of the workpiece 74, minus 0.005", is obtained. An opening having the same size as the opening 80 drilled in the workpiece 74 is drilled in the set-up coupon. The opening is cleaned, after which the blade pilot 84 is inserted in the opening. The nosepiece 66 is adjusted until the blade tip of the cutting blade 83 is flush. A second set-up coupon (not shown) having the same material thickness of the workpiece 74 is obtained, and an opening is drilled in the second set-up coupon. The blade pilot 84 is inserted in the opening while the nosepiece 66 is seated perpendicular and the cutting blade 83 is in the home position. The drill motor of the drill (not shown) is operated slowly. The chamfer is disassembled and checked for undercut into the metal. The chamfer depth control knob 68 is then adjusted until the desired depth is achieved, followed by re-testing. After the desired depth is achieved, the aluminum plate is removed and the titanium plate is replaced in the set-up coupon. An opening is deburred in the set-up coupon and the chamfer depth on the titanium is checked, after which the necessary adjustment is made.

As shown in FIG. 14, in the deburring of a first titanium plate 86 and a second titanium plate 87, a plate gap 88 of a minimum of 0.010" is required between the plates. After insertion of the blade pilot 84 into the drilled opening, the nosepiece 66 is rotated counterclockwise until the cutting blade 83 touches the edge of the opening. The spindle is rotated ⅛ of a turn for a few times. This results in a shiny mark on the edge of the opening and the cutting blade 83. The nosepiece 66 is then rotated until the shiny mark on the cutting blade 83 is about 0.005" away from the tip o the cutting blade 83.

As shown in FIG. 15, in some applications it may be necessary to modify the blade pilot 84 and the cutting blade 83 under circumstances in which there exists limited travel for the blade pilot 84 and when the blade pilot 84 must traverse two different opening sizes. A first opening (not labeled) extends through a titanium plate 90 and a second opening (not labeled) extends through a graphite plate 91. A shim 92 may be interposed between the first titanium plate 90 and the graphite plate 91. For example, under circumstances in which a forcemate bushing must be removed and a freeze plug installed and the titanium structure must be deburred prior to installation of the freeze plug, the blade pilot 84 must be modified. Accordingly, the thickness of the shim 92 must be known since the thickness of the shim 92 determines the travel limit of the blade pilot 84. The blade pilot 84 is pulled out slowly until the tip of the cutting blade 83 is even with the outer diameter of the blade pilot 84. The gap at the faying surface of the blade pilot 84 and the cutting blade adjustment shaft 82 is measured. A spacer/washer is fabricated and placed at the gap, after which the pilot 84 and the cutting blade 83 are assembled. The distance between the end of the blade pilot 84 and the tip of the cutting blade 83 is measured. The end of the blade pilot 84 is grinded to match the smaller of the two openings. The deburring tool 64 is assembled, after which the blade protrusion is adjusted.

Figure 17:
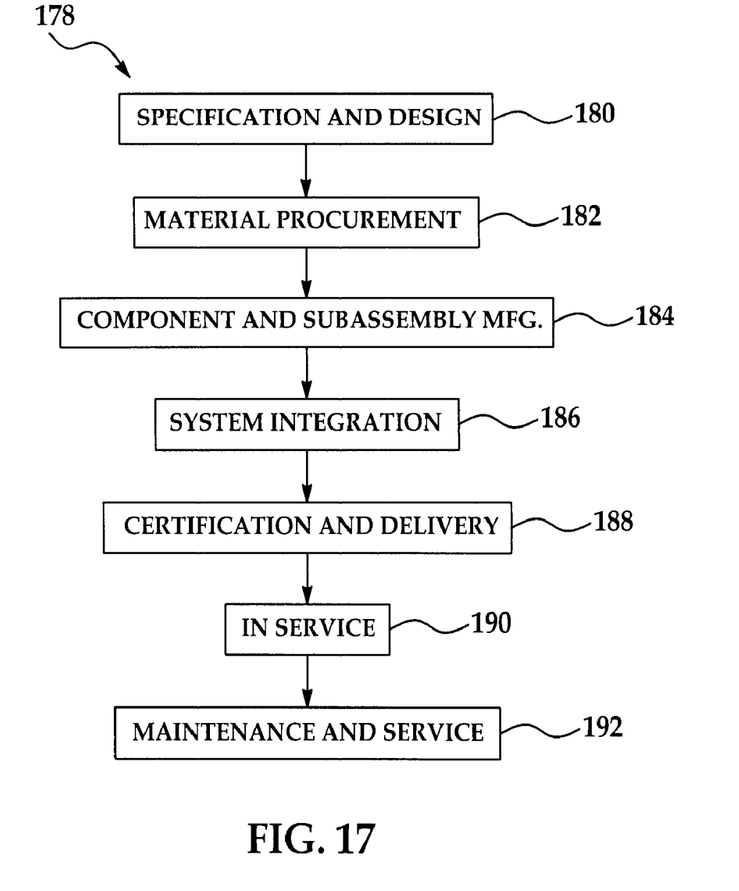
FIG. 17 is a flow diagram of an aircraft production and service methodology.
Figure 18:
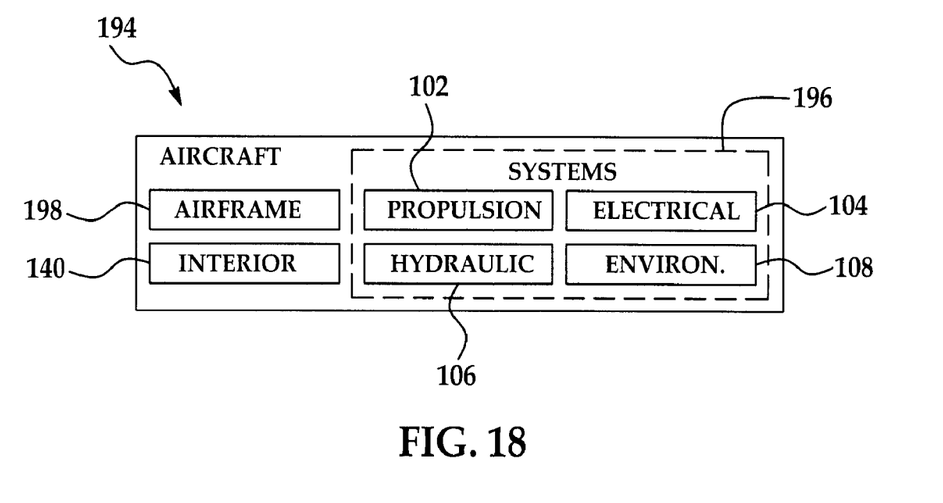
FIG. 18 is a block diagram of an aircraft.

Referring next to FIGS. 17 and 18, embodiments of the disclosure may be used in the context of an aircraft manufacturing and service method 178 as shown in FIG. 17 and an aircraft 194 as shown in FIG. 18. During pre-production, exemplary method 178 may include specification and design 180 of the aircraft 194 and material procurement 182. During production, component and subassembly manufacturing 184 and system integration 86 of the aircraft 194 takes place. Thereafter, the aircraft 194 may go through certification and delivery 188 in order to be placed in service 190. While in service by a customer, the aircraft 194 may be scheduled for routine maintenance and service 192 (which may also include modification, reconfiguration, refurbishment, and so on).

Each of the processes of method 178 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 194 produced by exemplary method 178 may include an airframe 198 with a plurality of systems 196 and an interior 100. Examples of high-level systems 196 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 178. For example, components or subassemblies corresponding to production process 184 may be fabricated or manufactured in a manner similar to components or subassemblies produced while the aircraft 194 is in service. Also, one or more apparatus embodiments may be utilized during the production stages 184 and 186, for example, by substantially expediting assembly of or reducing the cost of an aircraft 194. Similarly, one or more apparatus embodiments may be utilized while the aircraft 194 is in service, for example and without limitation, to maintenance and service 192.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of forming an opening in a layered structure, comprising:
providing a layered structure including a first layer and a second layer, a near-zero gap interface defined between said first layer and said second layer and a first fay surface on said first layer at said interface and a second fay surface on said second layer at said interface;
providing an opening through said layered structure such that said opening extends through said first layer and said second layer;
providing an internal chamfering device comprising a device housing and a tool bit extendable from said device housing; and
working simultaneously said opening in said fay surface of said first layer and said opening in said fay surface of said second layer by inserting said internal chamfering device in said opening and extending said tool bit from said device housing of said internal chamfering device without separating said first layer and said second layer.

2. The method of claim 1 wherein said working comprises chamfering said opening in said first layer and said second layer.

3. The method of claim 1 wherein said layered structure further includes an intermediate layer disposed at said interface such that said layered structure defines a sandwich-type structure with said first layer and said second layer defining first and second outer layers, respectively, such that said fay surface of said first layer and said fay surface of said second layer abut said intermediate layer;
said providing an opening further comprises drilling an opening through said layered structure such that said opening extends through each of said first and second outer layers and said intermediate layer; and
said working further comprises working simultaneously said opening in said fay surface of said first outer layer, said opening in said fay surface of said second outer layer and said opening in said intermediate layer without separating said first outer layer, said second outer layer and said intermediate layer.

4. The method of claim 3 wherein said first and second outer layers each comprise a metal or a composite.

5. The method of claim 4 wherein said intermediate layer includes an adhesive, or a sealant.

6. The method of claim 1 wherein said layered structure is a sandwich-type structure and one or more of said first and second layers include titanium and further comprising an intermediate composite layer between said first and second layers, a zero-gap interface defined between each of said first and second layers and said intermediate layer such that each of said first and second layers and said intermediate layer has a corresponding fay surface at an interface;
wherein the working further comprises working simultaneously said opening in said fay surface of a first one of said first and second layers and said opening in said fay surface of said intermediate layer without separating said first layer, said second layer and said intermediate layer.

7. The method of claim 6 further comprising working simultaneously said opening in said fay surface of a second one of said first and second layers and said opening in said fay surface of said intermediate layer without separating said first layer, said intermediate layer and said second layer.

8. The method of claim 1 further comprising a tool bit opening provided in said device housing and wherein said extending said tool bit from said device housing of said internal chamfering device comprises extending said tool bit through said tool bit opening.

9. The method of claim 1 wherein said providing an internal chamfering device comprising a device housing comprises providing an internal chamfering device comprising a device housing including a tool base, a center sleeve extending from said tool base and a rear sleeve extending from said center sleeve.

10. The method of claim 1 wherein said providing an internal chamfering device comprises providing an internal chamfering device comprising a cam bar in said device housing and displaceable along a longitudinal axis of said device housing and a tool bit slot provided in said cam bar and wherein said tool bit is slidable along said tool bit slot.

11. The method of claim 10 further comprising providing a first magnetoresistive tracking probe on said tool bit and a second magnetoresistive probe in said device housing in spaced-apart relationship with respect to said first magnetoresistive tracking probe.

12. The method of claim 10 further comprising providing a slot depression in said cam bar and wherein said tool bit slot extends along said slot depression.

13. The method of claim 12 further comprising providing a tool bit guide in engagement with said cam bar and wherein said tool bit is extendable from said tool bit guide.

14. An internal chamfering device, comprising
a generally elongated device housing having a tool bit opening;
a cam bar provided in said device housing and displaceable along a longitudinal axis of said device housing;
a slot depression provided in said cam bar;
a tool bit slot provided in said cam bar and extending along said slot depression;
a tool bit slidably engaging said tool bit slot and extendable through said tool bit opening; and
a magnetoresistive tracking probe carried by said tool bit and a main giant magnetoresistive probe provided in said device housing in spaced-apart relationship with respect to said magnetoresistive tracking probe.

15. The internal chamfering device of claim 14, wherein the tool bit is movably coupled to said cam bar within said tool bit slot to slidably engage said tool bit slot and extend through said tool bit opening.

16. The internal chamfering device of claim 14 wherein said device housing comprises a tool base, a center sleeve extending from said tool base and a rear sleeve extending from said center sleeve.

17. The internal chamfering device of claim 14 further comprising an x-axis tool bit motor engaging said cam bar and adapted to slide said cam bar in said device housing.

18. The internal chamfering device of claim 14 further comprising a z-axis plunge motor to move said device housing along a z-axis and a y-axis rotation motor to rotate said device housing about a y-axis.

* * * * *